Oct. 26, 1965    G. W. BECK ETAL    3,214,128
ICE TRAY
Filed Nov. 8, 1963    2 Sheets-Sheet 1

INVENTORS
George W. Beck
Patsy DeVincent
BY
J.C. Evans
Their Attorney

Oct. 26, 1965   G. W. BECK ETAL   3,214,128
ICE TRAY
Filed Nov. 8, 1963   2 Sheets-Sheet 2

INVENTORS
George W. Beck
Patsy DeVincent
BY
J.C. Evans
Their Attorney

United States Patent Office 3,214,128
Patented Oct. 26, 1965

3,214,128
ICE TRAY
George W. Beck and Patsy De Vincent, Dayton, Ohio, assignors to General Motors Corporation, Detroit, Mich., a corporation of Delaware
Filed Nov. 8, 1963, Ser. No. 322,435
3 Claims. (Cl. 249—66)

This invention relates to freezing trays for the production of discrete particles of frozen material when used in association with refrigeration devices and more particularly to freezing trays of the flexible, self-supporting plastic type.

The use of a flexible plastic mold having cavities therein for containing liquid to be frozen into discrete particles has been proved desirable from the standpoint of economy, ease of production and relative ease in the removal of frozen particles therefrom. While such flexible plastic molds are suitable for their intended purpose, they present certain problems in that most plastics having a desired combination of flexibility and self-sustaining structural strength have lesser heat conducting properties than most metal trays and, hence, require a greater duration of freezing time to produce hard particles of frozen material. Another problem with flexible plastic molds used as freezing trays is that those plastic materials that have the best self-sustaining strength properties usually do not have a degree of flexure that will insure that the frozen particles supported therein will be fully ejected therefrom upon being distorted. Yet another problem with most flexible plastic freezing trays is that they tend to deteriorate upon repetitious flexure thereof.

Accordingly, an object of the present invention is to provide an improved flexible plastic freezing tray including the provision of means serving the plural function of increasing the freezing rate of liquid contained in cavities within the tray; to increase the structural strength of the tray and to increase the resiliency thereof for producing a uniform distortion pattern throughout the walls of the fluid containing cavities to insure ejection of frozen material from the tray.

A further object of the present invention is to improve resilient flexible plastic freezing trays by the provision of a resilient metallic insert secured throughout the length of the tray for reinforcing the tray and providing good thermal conduction properties for increasing the freezing rate of liquid contained in the tray and having a configuration to produce a uniform distortion pattern in the walls of liquid containing cavities in the tray when the tray is twisted along the longitudinal axis thereof for assuring complete ejection of all the frozen material from the tray.

Further objects and advantages of the present invention will be apparent from the following description, reference being had to the accompanying drawings wherein preferred embodiments of the present invention are clearly shown.

Referring now to FIGURES 1 through 4, an improved freeding tray suitable for either hand actuation or automatic actuation in association with an ice maker of the type disclosed in the copending application to Kniffen et al., S.N. 283,165, filed May 22, 1963, is illustrated as comprising an elongated mold 10 preferably formed from a high density linear polyethylene plastic material that is flexible and of sufficient structural strength to contain liquid to be frozen in receptacles formed therein. While the linear polyethylene material is preferred, any other flexible plastic material having self-sustaining structural characteristics are suitable for use in the present invention.

Figure 1:
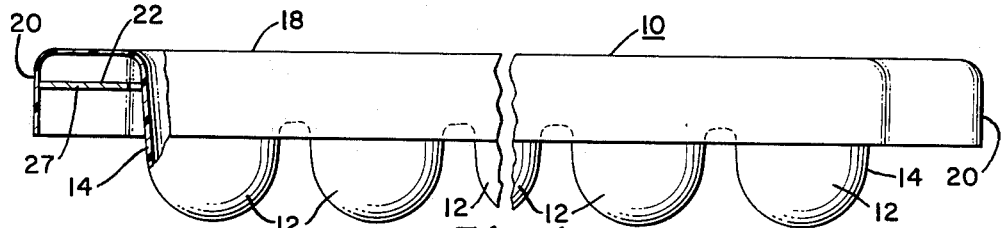
FIGURE 1 is a view in side elevation of an improved freezing tray with the mid-part thereof broken away.
Figure 2:
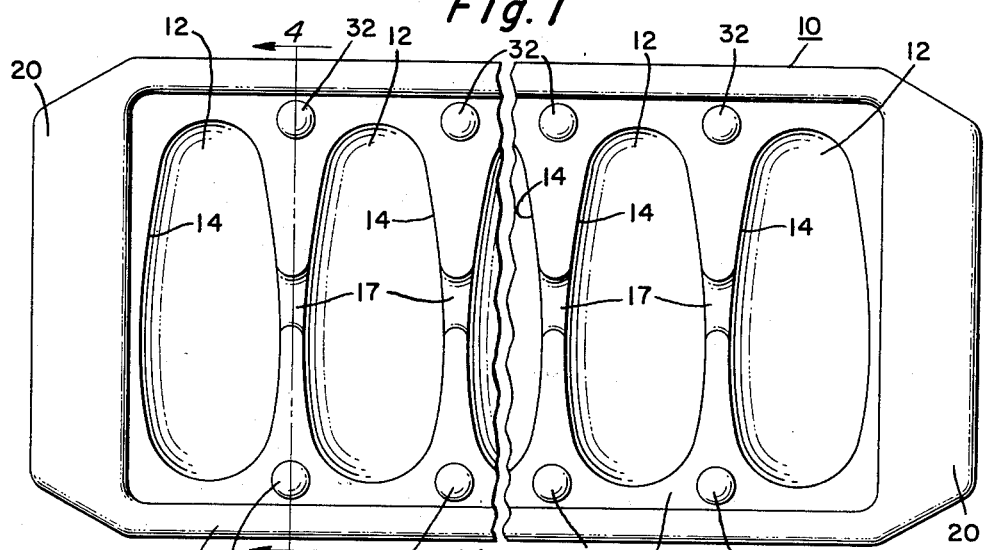
FIGURE 2 is a view in top elevation of the tray of FIGURE 1.
Figure 3:
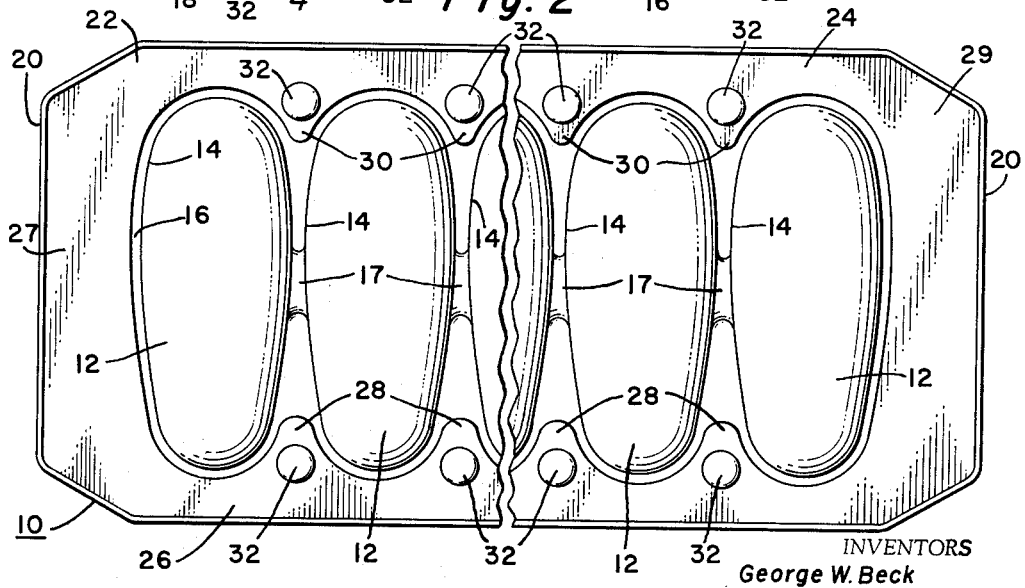
FIGURE 3 is a view in bottom elevation of the tray of FIGURE 1.
Figure 4:
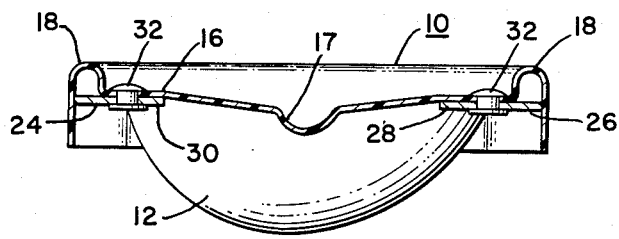
FIGURE 4 is a view in vertical section taken along the line 4—4 of FIGURE 2.

The mold 10 more particularly includes a plurality of receptacles or compartments 12 having wall portions 14 representatively illustrated as forming a somewhat semi-egg shaped cavity for containing liquid in the mold 10 to be cooled into hard frozen discrete particles such as ice cubes. The shape of the compartments 12 is more particularly set forth in U.S. Patent No. 3,075,364 to Kniffen for Ice Block Tray, it being understood that other shapes would be equally suited for use in the invention. The mold 10 further includes a supporting surface 16 for the receptacles 12 integrally formed with the upper edges of the walls 14 for locating the receptacles 12 in axial alignment along the length of the mold 10 and for spacing them apart a predetermined distance as best illustrated in FIGURES 2 and 3. A channel-way 17 formed in surface 16 between each of the compartments 12 serves to equalize water level in each compartment and further serves as a fulcrum point during flexure of the tray to aid in cube ejection therefrom.

The supporting surface 16 also has an inverted channel-shaped reinforcing member 18 integrally formed on the periphery thereof to extend continuously around the mold 10 for increasing the structural strength thereof sufficiently to prevent its collapsing when the receptacles 12 are filled with liquid. The reinforcing member 18 is raised above the supporting surface 16 to serve as a liquid dam in case the receptacles 12 are filled to overflowing.

In the illustrated embodiment, at each end of the mold 10 a handle 20 is integrally formed with the supporting surface 16 and reinforcing flange 18 to serve as a bearing point for applying a twisting force on the mold 10 to produce torsional flexure therein so as to distort the walls 14 of the receptacles 12 sufficiently to detach frozen particles supported therein prior to ejection or dumping of the particles from the mold 10.

In accordance with certain of the concepts of the present invention, the improved freezing tray 10 includes a resilient metallic inlay 22 located in juxtaposition with the supporting surface 16 below the top edge of the walls 14 of the receptacles 12. In the illustrated embodiment, the metallic inlay 22 is cut out throughout the central portion thereof to form longitudinally directed side portions 24, 26 interconnected at either end thereof by means of cross pieces 27, 29. The side portions 24, 26 include a plurality of tab portions 28, 30, respectively, directed inwardly of the mold 10 in juxtaposition with a portion of the supporting surface 16 between each of the receptacles 12. The tab portions 28, 30 each has a rivet 32 directed therethrough for securing the metallic inlay 22 to the supporting surface 16 so that the wall portions 14 of the receptacles 12 are located in nested relationship with the metallic inlay 22. By virtue of the inclusion of the metallic inlay 22 on the flexible plastic mold 10, the mold is reinforced to withstand a relatively large number of repeated distortions and also is less susceptible to being collapsed when filled with liquid to be frozen therein.

A further feature of the present invention is that the metallic inlay 22 affords a good heat conducting path from the mold 10 and hence increases the freezing rate of the liquid supported thereby and because of its location adjacent the upper edge of the walls 14 of the receptacles 12, the freezing progresses from the top to the bottom of the cube to produce a more complete freezing of the liquid contained in the receptacle 12 for a predetermined freezing environment.

Another important feature of the metallic inlay 22 is that the provision of a highly resilient layer of material in juxtaposition with the supporting surface 16 improves the ability to distort the mold 10 for loosening frozen particles from the receptacles 12 therein. More particularly, the provision of the tabs 28, 30 thereon produces a uniform disortion pattern throughout the walls 14 of the receptacles 12 when the mold 10 is twisted along the longitudinal axis thereof. This uniform disortion insures that the frozen material is released from the walls 14 to thereby allow for quick dumping or ejection of the particles from the mold 10.

Figure 5:
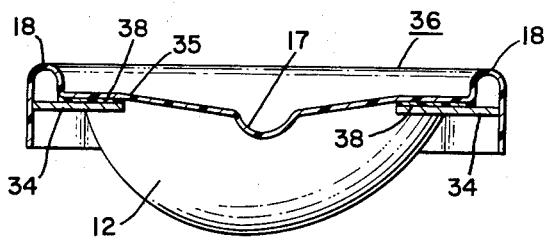
FIGURE 5 is a view in section of a modification of the present invention.

In the embodiment of FIGURE 5 a layer of resilient metallic material shaped like the metallic inlay 22 is secured to the supporting surface 35 of a mold 36 by means of a layer 38 of a suitable epoxy resin or the like having good heat transfer properties with the epoxy resin 38 serving the same function as the rivets 32 illustrated in the first embodiment.

Figure 6:
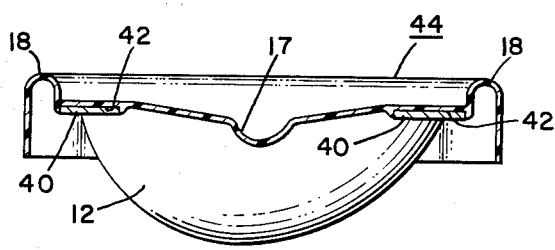
FIGURE 6 is a view in section of a further modification of the present invention.

The embodiment illustrated in FIGURE 6 illustrates another mode of fastening a metallic flexure plate to the mold and includes a plate 40 similar to plate 22 seated within a recess 42 in a mold 44 similar to mold 10 but being molded integrally therewith within the recess 42 during the manufacture of the mold 44.

While the above illustrated embodiments of the invention are directed to a mold arrangement having a single row of receptacles formed therein, it will be appreciated that the use of a metallic inlay or flexure plate such as those in the illustrated embodiments is adaptable for use in arrangements wherein a mold of flexible plastic material is formed to have a plurality of receptacles directed transversely and longitudinally of the mold and wherein the receptacles are of other geometric shapes than those illustrated.

While the embodiments of the present invention as herein disclosed constitute preferred forms, it is to be understood that other forms might be adopted.

What is claimed is as follows:

1. A freezing tray for the production of ice cubes comprising, a plurality of receptacles for containing a liquid to be frozen, an elongated planar surface interconnecting said receptacles at the upper edge thereof including means for spacing each of said receptacles, and means for aligning said receptacles relative to a substantially longitudinal twisting axis, means for reinforcing said planar surface including a flat plate located in juxtaposition with said planar surface below the upper edge of said receptacles, said plate including a plurality of resilient tabs located between each of said receptacles that act upon twisting of the tray to produce a substantially uniform distortion pattern in the walls of said receptacles to insure extraction of frozen material therefrom.

2. A freezing tray for the production of discrete cubes of frozen material comprising, an elongated mold of flexible plastic material including a plurality of cube cavities and planar surface portions interconnecting said cube cavities in spaced relationship and in substantial axial alignment along a longitudinal twisting axis, each of said cube cavities including wall portions having the upper edge thereof integrally formed with said planar surface portions, means for reinforcing said planar surface including a flexible metallic plate located in juxtaposition with said planar surface throughout the full extent of said surface except for the portions of said planar surface between each of said cube cavities, said plate including tab portions thereon for uniformly flexing said cube cavities to produce a uniform distortion pattern in the walls thereof so as to insure ejection of frozen material from said mold upon twisting along the longitudinal twisting axis thereof.

3. A freezing tray for the production of discrete particles of frozen material comprising, an elongated mold of flexible plastic material having a longitudinal twisting axis, said mold including a plurality of cavities and a supporting surface for said cavities that serves to align said cavities along the longitudinal twisting axis of said mold and locate them in spaced relationship with one another, flexure means including a plate of good heat conducting material located in juxtaposition with said supporting surface throughout the full extent thereof except for portions thereof located between said cube cavities, said flexure means including means that cooperate with said supporting surface upon twisting of the mold along its longitudinal axis to produce a substantial uniform distortion pattern in said cavities to insure ejection of frozen particles therefrom.

References Cited by the Examiner

UNITED STATES PATENTS

| | | | |
|---|---|---|---|
| 1,935,405 | 11/33 | Leyner | 62—370 |
| 2,004,525 | 6/35 | Geyer et al. | 62—370 |

ROBERT A. O'LEARY, *Primary Examiner.*